United States Patent
Macy

[15] 3,697,947

[45] Oct. 10, 1972

[54] CHARACTER CORRECTING CODING SYSTEM AND METHOD FOR DERIVING THE SAME

[72] Inventor: James R. Macy, Newport Beach, Calif.

[73] Assignee: American Data Systems, Inc., Canoga Park, Calif.

[22] Filed: Nov. 16, 1970

[21] Appl. No.: 89,871

[52] U.S. Cl. ........................................340/146.1 AQ
[51] Int. Cl. ................................................G06f 11/12
[58] Field of Search ............................340/146.1 AQ

[56] References Cited

UNITED STATES PATENTS

| | | | |
|---|---|---|---|
| 3,566,352 | 2/1971 | Massey | 340/146.1 |
| 3,500,320 | 3/1970 | Massey | 340/146.1 |

OTHER PUBLICATIONS

W. W. Peterson, Error Correcting Codes, MIT Press and John Wiley & Sons, Inc., 1961, pp. 217–235.

*Primary Examiner*—Charles E. Atkinson
*Attorney*—Fulwider, Patton, Rieber, Lee & Utecht

[57] ABSTRACT

Apparatus and method for utilizing and deriving a self-orthogonal, convolutional character correcting coding system. In an encoder, a parity check bit stream is generated from a modulo-2 summation of two different prior information bits from each of three information bit streams and all four bit streams are transmitted simultaneously. In a receiving decoder, the same modulo-2 summation of prior received information bits is modulo-2 summed with a currently received parity check bit to form a syndrome bit stream. Particular syndrome bits along the stream are combined to form three correction bit streams for correcting erroneous bits in each of the three information bit streams. A method for determining code operators, specifying which information bits are to be combined, is described as being suitable for machine implementation and a computer program suitable for implementing the method is disclosed.

7 Claims, 4 Drawing Figures

INVENTOR.
JAMES R. MACY
BY Fulwider, Patton, Rieber, Lee, and Utecht
ATTORNEYS

INVENTOR.
JAMES R. MACY
BY Fulwider, Patton, Rieber Lee, and Utecht
ATTORNEYS

INVENTOR.
JAMES R. MACY
BY Zulwider, Patton, Rieber
Lee, and Utecht
ATTORNEYS

INVENTOR.
JAMES R. MACY
BY Lulwider, Patton, Rieber Lee, and Utecht
ATTORNEYS

CHARACTER CORRECTING CODING SYSTEM AND METHOD FOR DERIVING THE SAME

BACKGROUND OF THE INVENTION

1. Field of the Invention

The present invention relates generally to coding systems for communication systems and more particularly to a convolutional character correcting coding system and a method for deriving code operator arrays therefor.

2. Description of the Prior Art

Heretofore, coding systems for the detection of errors, or for the detection and correction of errors, have been devised for serial bit streams. Conventionally, the systematic serial transmission of a number of information bits is followed by the transmission of one or more redundant check bits, usually generated on a parity basis. The received information bits of the incoming bit stream are stored and compared in a predetermined manner with the parity bits to detect errors in the information bits. The errors may simply be detected and retransmission signaled, but provision is usually made in such coding systems to correct the erroneous information bits, if possible.

While a simple coding system may provide for the correction of only one error in a series of information bits, it is possible by a process known as interleaving to provide for the correction of a plurality of sequential, adjacent errors known as a "burst" provided a sufficient number of correctly received information bits, known as a "clear space," are received before and after the burst of errors. The ability of a coding system to correct such bursts of errors is particularly important in the field of digital data communications which utilize telephone lines as transmission media because such lines are particularly susceptible to interference and noise of a type which produces bursts of errors on transmitted data bit streams.

Two coding systems, the block codes and the convolution codes, are commonly employed in digital data communications systems. With a block code, the parity check bit is generated from a particular set of information bits immediately preceding the transmitted check bits. The set of information bits and the parity check bit is known as a "block" or "code word." It will be appreciated that with such a code, the bursts of errors must occur within the "block" or the errors cannot be corrected. Thus, if a burst of errors occurs within or overlaps a block, it may not be possible to correct the information bit errors in the block. For the convolution codes, the parity check bits are generated from information bits contained in a number of prior transmitted information bits in an indefinitely long bit stream. With a properly designed code, it is then possible to correct all of the erroneous information bits within most bursts of errors.

In the consideration of error correcting codes, the principal object of investigation is a "parity check matrix" which is an array of "1's" and "0's" which specify which of the set of prior information bits are to be combined to form the redundant parity check bits on transmitting and also to be combined again in the receiver and compared to the incoming parity check bits to determine if errors are present. Conventionally, the comparison yields a "1" for odd parity indicating an odd number of errors in the information and parity check bits. Similarly, the comparison yields a "0" or even parity, if there are no errors or an even number of errors. When the parity check matrix is properly constructed, the serial comparison of the information bit stream and the parity check bit stream yields a "syndrome" bit stream which indicates by its pattern which of the received information bits are in error.

Ordinarily, some syndrome pattern detection means is employed to generate a correction bit stream which is used to change the value of particular information bits. The result may be a corrected error or, infrequently, an additional error.

It will be appreciated that as the stream of serial information bits which are to be corrected becomes longer, the proper construction of the parity check matrix for proper operation becomes more complicated. This is particularly true of convolution codes because the parity check matrix must take into account an indefinitely long stream of information bits in order to generate a stream of parity check bits. The total number of prior bits which must be considered for proper error correction is known as the "constraint length" of a particular code. For most practical implementation, a code having the shortest constraint length for a particular class of codes is normally utilized.

A class of convolution codes known as the self-orthogonal convolution codes, because of the self-orthogonal mathematical characteristic of their parity check matrixes, has reduced the complexity of working with such codes but, even for a relatively small number of serial information bits which are to be checked and corrected, the selection of a workable parity check matrix rapidly becomes a formidable task. Because of this complexity, such error-correcting coding systems have heretofore been considered principally on the basis of a single serial bit stream.

SUMMARY OF THE INVENTION

The present invention provides a self-orthogonal convolutional coding system for correcting all the information bits in characters comprised of a plurality of bits which are transmitted and received simultaneously for each transmission bit time. A single parity check bit is generated and transmitted simultaneously with the information bits of each character, the parity check bit being generated by a combination of particular prior information bits in each of a plurality of separate and independent information bit streams forming the transmitted characters.

On reception, the incoming information bit streams are re-encoded in the same format as in the transmitting encoder and a comparison is made with the incoming parity check bit stream to generate a syndrome bit stream. The generated syndrome bits are then combined in a predetermined pattern to form correction signals which are capable of correcting any or all of the information bits in an entire character rather than a single bit as in the prior art. It should be appreciated that a burst of serial bits was correctable in the prior art error correcting codes by means of interleaving whereas, in the coding system of the present invention, interleaving provides for the correction of bursts of entire characters rather than mere bits.

The character correcting code of the present invention operates substantially within the limiting criteria found for serial bit stream error correcting codes. Thus, the constraint length, clear space and redundancy factors for the character correcting coding system of the present invention have been found to be comparable to ordinary convolution codes, but the coding system is still capable of correcting entire characters and not just a single bit.

A key factor in the successful operation of the character correcting code of the present invention is the proper selection of a "code operator" which is analogous to the parity check matrix of serial bit stream coding systems. The code operator generally comprises a plurality of row vectors, one vector for each information bit stream and one vector for the parity check bit stream.

While the code operator and parity check matrix perform similar functions, it will be appreciated that the proper selection of a code operator for generating a parity check bit from a plurality parallel information bit stream, as opposed to a single bit stream, is a much more complex task. The criteria may be specified for a proper code operator, namely; that the row vector corresponding to each information bit stream have a zero in its first position and no more than two ones in the remainder of its bit positions within the preselected constraint length; that each column position of the aligned row vectors have only a single "1;" and that the inner product of each row vector and a syndrome vector produce no more than one correction bit equal to "1" as the row vector is horizontally displaced within its predetermined permissible limits, the syndrome vector being defined as the modulo-2 sum of each column of the code operator vectors and a parity check row vector which is uniquely defined as having a single "1" in its first position and "0's" thereafter.

While trial code operators may be checked manually by the above criteria, the number of code operator combinations which need be checked for even a minimum constraint length is considerable and a manual solution is impractical. Thus, the present invention includes a method for determining suitable code operators. The format of the method is in a form suitable for machine implementation such as by programming a digital computer. The method is based primarily on the above stated criteria placed in a suitable step-by-step procedure designed to eliminate a code operator being tested as soon as possible if it is not satisfactory.

Thus, the present invention provides a self-orthogonal, convolutional character coding system capable of correcting a plurality of information bits which may be simultaneously transmitted in the form of a character, the coding system substantially meeting the limiting criteria of prior art serial bit stream, convolutional error correcting codes. Additionally, a method for deriving suitable code operators for the character correcting code is provided in a format which is suitable for machine implementation, preferably by means of a programmed computer.

DESCRIPTION OF THE PREFERRED EMBODIMENT

Figure 1:
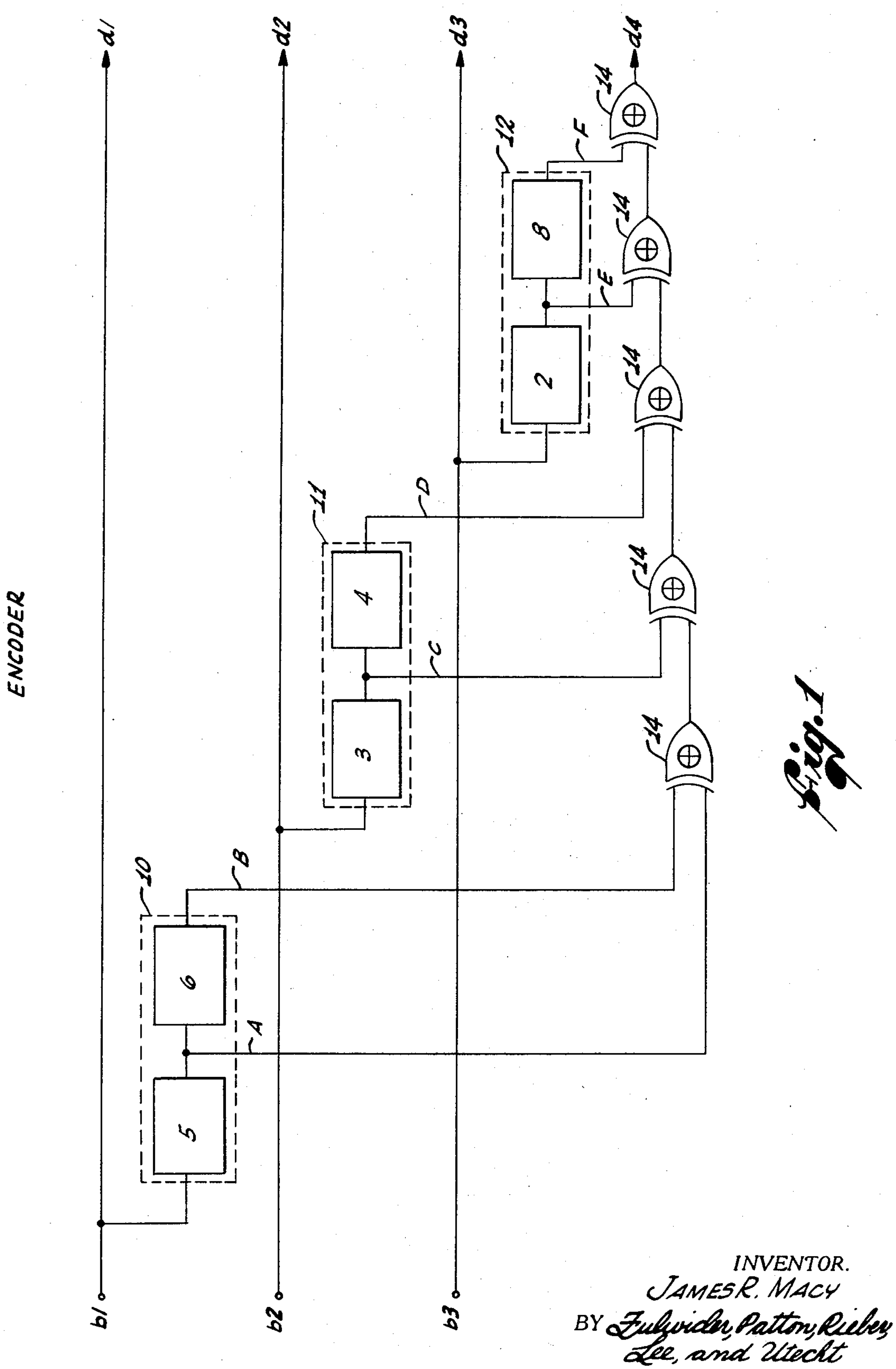
FIG. 1 is a combined functional block and logic diagram of a presently preferred embodiment of an encoder constructed in accordance with the present invention.

The system of the present invention is a self-orthogonal, convolutional coding system for correcting characters rather than single bits. In this regard, the coding system conforms to the general criteria which have been established for all error correcting, convolutional coding systems. Therefore, the coding system of the present invention can correct a character only when data from a sufficient number of prior characters is used to generate the parity check bit in the transmitter and the syndrome bits in the receiver. The number of prior characters required, inclusive of the first and last character, is known as the constraint length for the particular code being used. In general, the constraint length of any code of this type depends on the number of information bits in the character to be corrected.

As will be discussed below, the coding system of the present invention is applicable to a general *n*-bit character but, for the purposes of the present discussion, the presently preferred embodiment is described in connection with a four-bit character. This is principally because of the limitations of the data communications system in which the described embodiment is utilized. Thus, it will be appreciated that the presently preferred embodiment for the four-bit character, containing three information bits and one redundant parity check bit, is for the purposes of illustration only.

For the four-bit character, the minimum constraint length has been found to be 12, that is, at least 12 characters, including the current character which is to contain the parity check bit, must be utilized in order that all the information bits in a character may be corrected. It should be noted that, while 12 is the minimum constraint length, there appears to be no maximum constraint length. However, from a practical standpoint, the minimum constraint length is normally utilized to reduce the cost of implementation.

In the data communications system in which the coding system of the present invention is utilized, three information bits and one parity check bit are transmitted simultaneously in each transmission bit time. In conformance with general convolutional coding theory, each parity check bit is a function of prior characters. In this case, the parity check bit for any character is a function of six different prior characters, one bit being utilized from each of two different characters for each of the three information bit streams forming the characters.

When the character is received, the three information bit streams are "re-encoded" and the same information bits from the same characters used in generating the parity check bit are modulo-2 added with the currently received parity check bit. Conventionally, if all of the characters, including the parity check bit, have been correctly received, or if an even number of errors occurs in those bits, the parity check is "-satisfied" and a "0" occurs at the output of the device used to check the parity. If the parity check is not satisfied, or if an odd number of errors is present, a "1" output is generated. The "0's" and "1's" generated by the parity check device form a syndrome bit stream.

In accordance with conventional convolutional coding systems, the syndrome bits are sequentially generated and stored in some memory device, such as a shift register, and, at appropriate times, the syndrome bits are combined in a predetermined pattern to generate three correction bit streams which are then applied to the corresponding information bit streams. An erroneously received character which is isolated from adjacent errors by clear spaces of correctly received characters can be completely corrected by the coding system of the present invention. As an erroneous character moves through information bit stream registers in the receiver, the bits in error each generate two syndrome "1's." These two "1's" occur in a predetermined pattern so that they can be used to generate a correction bit to change the information bit. It is this relatively simple pattern which is associated with self-orthogonal codes.

Further, in conformance with conventional convolutional coding theory, when a correction bit is generated, feedback to the syndrome storage device is used to cancel the syndrome bits which generated the correction signal. This is done to reduce the possibility of the syndrome bits generating an erroneous additional correction bit at a later time.

It has been found that when a burst of errors is received, the feedback function can actually increase the number of decoding errors. This phenomenon is known as error multiplication and the operation of the system of the present invention is also subject to the possibility of error multiplication. However, it has been found that the additional errors which are introduced are substantially contained within the neighborhood of the error burst itself so that blocks of data outside the burst are substantially unaffected. Normally, if a long error burst is encountered, retransmission is necessary from a practical standpoint regardless of the system being utilized. This is because such systems are ordinarily designed to correct errors which occur in bursts which are highly predictable over a long time period for a particular transmission system. Within such practical limits, it has been found that the character correcting coding system of the present invention is substantially comparable to the serial bit stream systems of the prior art in the area of error multiplication.

Turning now to the drawings, and particularly FIG. 1 thereof, the character correcting coding system of the present invention is implemented in a manner substantially similar to other decoding systems of this type. In this respect, the prior information bits in each of these input information bit streams *b*1–*b*3 are available for encoding by means of their being successively stored in shift registers for each information bit stream. Thus, shift registers 10, 11 and 12, respectively, of varying length are provided for each of the b1 through b3 information bit streams. Each of the shift registers 10, 11 and 12 has an output at a predetermined bit position along its length A, C and E and at its output B, D and F, respectively in accordance with the code operator criteria to be discussed below. Hereinafter, an output from a shift register will be called a "tap" regardless of its position along the register.

A parity check bit stream is generated by combining the prior information bits appearing at the taps A–F of the shift registers for the *b*1 through *b*3 information bit streams.

For the system of the present invention the *b*1 information bit stream is tapped at the fifth and 11th prior bit positions; the *b*2 information bit stream is tapped at the third and seventh prior bit positions; and the *b*3 information bit stream is tapped at the second and 10th prior bit positions. The combination of the prior information bits is made by modulo-2 summation. For the purposes of this discussion, modulo-2 summation means simply that, when a plurality of bits are summed, there will be "1" output of the summation only if the number of 1's which were combined is odd, indicating odd parity. The modulo-2 summation in this case is most conveniently implemented by means of a plurality of EXCLUSIVE-OR gates 14 with the tap outputs A–F of the shift registers 10, 11 and 12 forming successive inputs to the EXCLUSIVE-OR gates. The output of the last EXCLUSIVE-OR gate 14 is designated the *d*4 parity check bit stream which is emitted from the encoder with the *d*1–*d*3 information bit streams to form the complete four-bit character stream which is transmitted by means of a suitable and conventional data communication system (not shown).

As will be fully discussed below, while the implementation of the encoding system is relatively straight-forward, the selection of the proper shift register 10, 11 and 12 lengths and taps A–F is of utmost importance in the proper operation of the character correcting coding system of the present invention. For this reason, the implementation of the coding system itself is of secondary importance and the encoder shown in FIG. 1 is a functional illustration only. Thus, it should be appreciated that the actual encoder would contain a number of control and timing circuits compatible with the data-communications system and would be well known to those of ordinary skill in the data communications art.

For the purposes of this discussion, it will be presumed that the *d*1 through *d*4 bit streams are capable of being simultaneously transmitted through the data communication system in which the character correcting coding system of the invention is utilized. Further, for the purposes of this discussion, it will be presumed that the d1 through d4 bit streams are available as an input to the decoder shown in FIG. 2. Additionally, however, it will be presumed that there is a possibility that one or more of the information bits, or the parity check bit, of a character which is received at any particular bit time may be in error because of noise, interference, or the like, in the data communication system. Additionally, it will be presumed that the erroneous character is preceded and followed by a relatively large number of correctly received characters. The possibility of erroneous adjacent characters is provided for by interleaving, to be discussed below. It is the function of the decoder shown in FIG. 2 to detect which of the incoming information bits has been erroneously received and (within the limiting criteria of the system) to correct those information bits before they leave the decoder in the *b*1 through *b*3 information bit streams which entered the encoder of FIG. 1.

In order to determine whether any of the received bits of a character have been erroneously received, the incoming information bit streams *d*1–*d*3 are re-encoded to ascertain whether the original parity relationship is still true. Because the parity check bit of a currently received character is a function of prior received information bits, the incoming information bit streams *d*1–*d* 3 are sequentially stored in shift registers 16, 17 and 18, respectively, in FIG. 2. It will be appreciated that, since one or more of the prior information bits of the *d*1–*d*3 bit streams may be in error, requiring correction, the output bit streams *b*1–*b*3 from the decoder are delayed by the length of time necessary for the information bit streams *d*1–*d*3 to pass through their respective shift registers 16, 17 and 18.

The shift registers 16, 17 and 18 are tapped at bit positions which are the same as those in the encoder to develop signals A through F which are analogous to those used to generate the parity check bit stream *d*4. The parity relationship is checked by forming the modulo-2 sum of the A through F signals and the currently received parity check bit. As in the encoder, the modulo-2 sum is most conveniently formed by applying the A through F and parity check bit to a series of EXCLUSIVE-OR gates 20. The output G of the last EXCLUSIVE-OR gate 21 then indicates whether parity is true or false.

It should be appreciated that, since the parity relationship is checked with the same information bits which were used to generate the particular parity check bit, the parity should be even with a bit value of "0" if all of the information bits have been correctly received, or if there are an even number of errors. Therefore, if the output G is a "1" indicating an odd parity condition, an odd number of bits must have been erroneously received. The output of the parity check device is conventionally called a "syndrome" bit. It should be noted that, as briefly mentioned above, a syndrome "1" will be generated by an erroneous information bit as it appears at two separate tap positions in its respective shift register. The sequentially generated syndrome bits, forming a syndrome bit stream, are sequentially stored in a syndrome register 22 so that a syndrome bit pattern is developed from the two syndrome "1's" generated by each erroneous information bit. At a pre-selected point in time, both syndrome "1's" associated with a particular erroneous information bit will appear at two pre-selected positions in the syndrome register 22. The two syndrome "1's" may then be combined by some suitable means, such as a logical AND gate, to generate a correction bit to correct the erroneous information bit.

Figure 2:
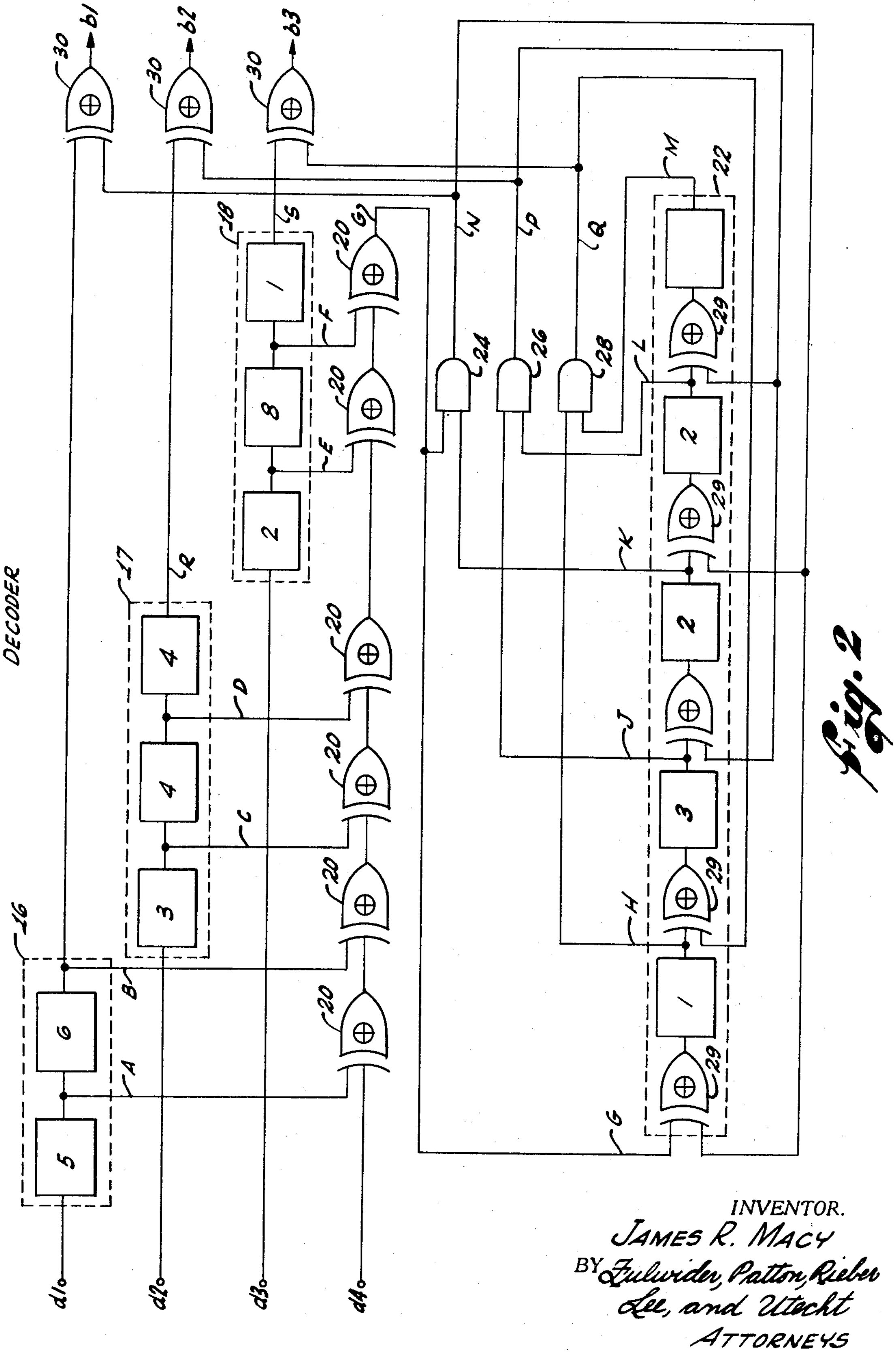
FIG. 2 is a combined functional block and logic diagram of a presently preferred embodiment of a decoder to be used in conjunction with the encoder of FIG. 1.

Therefore, as will be noted from FIG. 2, the bits appearing at G are combined with the bits appearing at tap K of the syndrome register 22 by means of an AND gate 24 to generate a correction bit stream N for the *d*1 information bit stream. Similarly, the bits appearing at tap positions J and L are combined in an AND gate 26 to generate a correction bit stream P for the *d*2 information bit stream; and the bits appearing at tap positions H and M are combined by means of an AND gate 28 to generate a correction bit stream Q for the *d*3 information bit stream.

The correction bit streams N, P and Q are fed back simultaneously with their generation to EXCLUSIVE-OR gates 29 which have the syndrome bits which generated the correction bits as their other inputs. The syndrome bits are then canceled or removed from the syndrome register 22 after they have generated the correction signals.

It should be noted that, since two syndrome bits are needed to generate a correction bit, a syndrome bit generated by an erroneously received parity check bit would appear only at one tap position at a time as it progressed through the syndrome register 22. Thus, a correction signal could be generated by an error in the parity check bit stream only for the statistically unlikely case of two sequential errors in the parity check bit stream spaced from each other so the two corresponding syndrome bits simultaneously appear at the appropriate tap positions of the syndrome register 22 to generate the erroneous correction bit. It should be noted that such errors in the parity check bit stream *d*4 are not within the clear space assumptions previously made. Thus, from a practical standpoint, the coding system of the present invention detects and corrects only errors in the three received information bit streams *d*1–*d*3.

An information bit to be corrected may not appear at the output of the information bit stream shift registers 16, 17 and 18 at the same time that the last syndrome bit is generated if all the registers were the same length as those used in encoding. This is because the syndrome bits for two of the information bit streams *d*1–*d*3 must move into the syndrome register 22 a certain number of bit positions before a correction signal can be generated. Thus, certain of the shift registers 16, 17 and 18 in the information bit streams, namely those registers 17 and 18 in the d2 and d3 information bit streams, are expanded by a suitable number of bit positions so that the erroneous information bit arrives at the output of the shift register simultaneously with the generation of the appropriate correction bit. The erroneous information bits are then combined by means of EXCLUSIVE-OR gates 30 with the appropriate correction bits and the corrected information bits emerge as the original *b*1–*b*3 bit streams. It should be appreciated that there is always the possibility of an undetectable error which cannot be corrected. This would occur if there were an even number of errors in the information bits forming the parity check bit with the resulting parity check bit being a "0" which would be interpreted as correctly received information bits.

Figure 3:
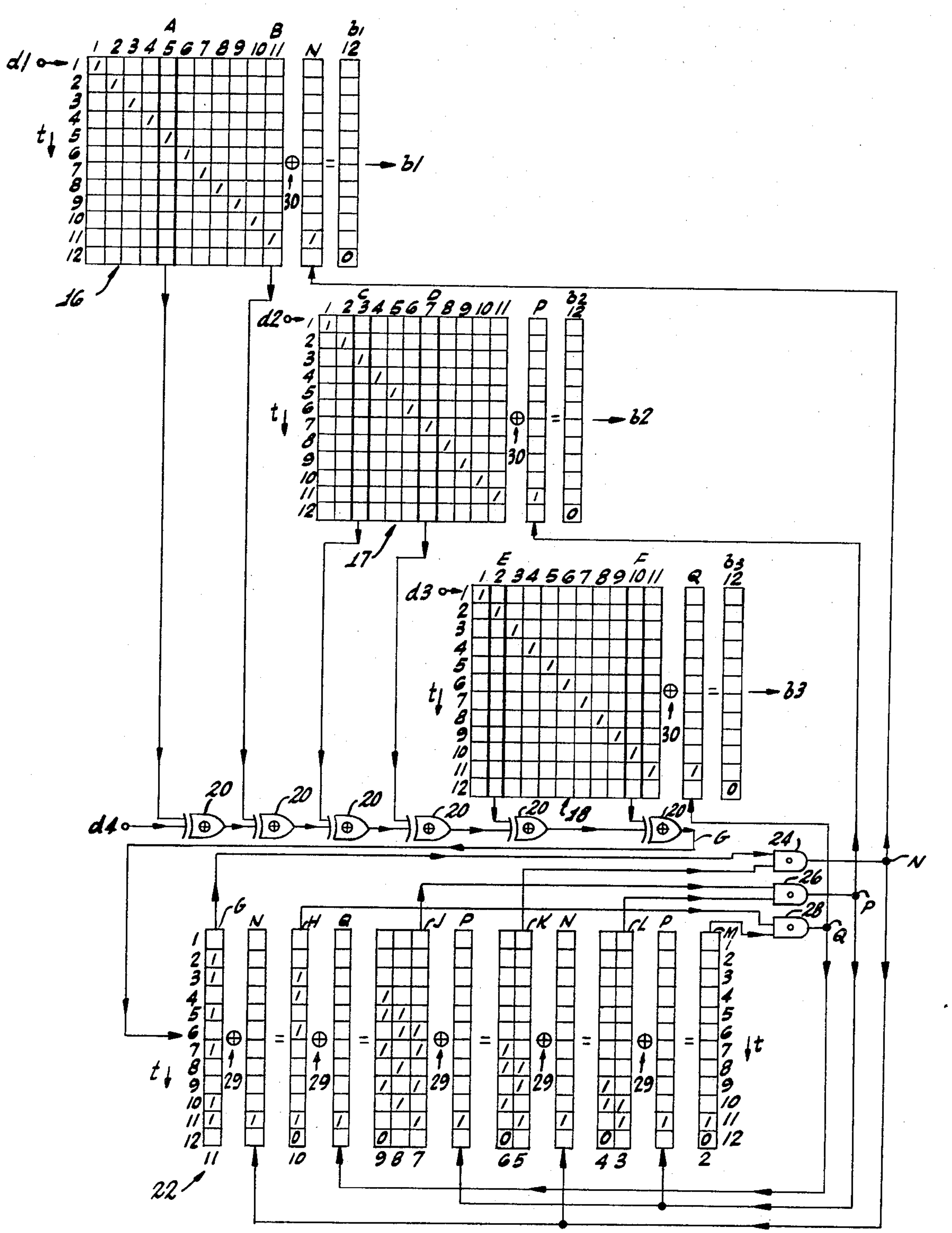
FIG. 3 is a combined table and functional logic diagram of the decoder of FIG. 2 with the shift registers expanded in terms of register bit positions and sequential bit times to illustrate the process of correcting an erroneously received character.

The operation of the decoder of FIG. 2 in the actual correction of erroneous information bits is illustrated, and is most clearly understood, by reference to FIG. 3. In this FIGURE, the shift registers 16, 17, 18 and 22 are expanded horizontally to show shift register bit positions and expanded vertically to illustrate the condition of a shift register at successive bit times as the information and syndrome bits move through the registers. Modulo-2 summation operations performed between a shift register bit position and a second input are illustrated by means of the EXCLUSIVE-OR symbol (⊕)

29, 30, placed between a shift register position and an input column indicating the condition of the second input at that time. The following bit time columns illustrate the condition of the following shift register bit position after the modulo-2 summation.

For the purposes of the following discussion, it will be assumed that all of the transmitted information bit streams *d*1–*d*4 should have been "0's" so that a "1" indicates an erroneous information bit. Also, it is to be assumed that, at an illustrative bit time *t*1, all three information bits of one character are erroneously received. For the purposes of this discussion, it will be assumed that the received parity check bit is correctly received as a "0." Thus, at *t*1, the first shift register position of each of the information bit shift registers 16, 17 and 18 contains a "1" and as can be seen from FIG. 3, the erroneous information bits successively move through the shift registers until t11 is reached. It can also be seen, that the erroneous "1's" appear at the various tape A–F as they proceed through the shift registers 16, 17 and 18.

Since the erroneous bit in each information bit register 16, 17 and 18 appear at the taps A–F at different bit times, a succession of "1" outputs appear at the output G of the final EXCLUSIVE-OR gate 20 and are fed to the syndrome register 22. Thus, at *t*2, the erroneous *d*3 bit appears at the second shift register bit position tap E and produces an output at G which is fed to the first bit position of the syndrome register 22. Again, at *t*3, the erroneous bit in the d2 information bit stream appears at the third bit position tap C and also results in a "1" bit being fed to the input to the syndrome register 22. Similarly, a "1" bit is generated by the erroneous bit in the *d*1 information bit stream at *t*5. It should be appreciated that, at this point, a "1" bit has been generated by the erroneous bit in each of the three *d*1 through *d*3 information bit streams. However, in order to effect correction of the erroneous information bits, a second "1" bit is generated by each of the erroneous information bits as they move through the shift registers 16, 17 and 18. Thus, at *t*7 the erroneous bit in the *d*2 information bit stream generates another "1" bit. Similarly, the erroneous bit in the *d*3 bit stream generates a "1" bit at *t*10 and the erroneous bit in the *d*1 bit stream generates a "1" bit at *t*11.

As each "1" syndrome bit enters the syndrome register 22 it moves through the register and appears at various taps labeled G, H, J, K, L and M. Disregarding for the moment the EXCLUSIVE-OR combinations associated with the inputs N, P and Q, it can be seen that the syndrome "1" bits have been distributed throughout the syndrome register by *t*11. Since the proper correction bits can only be generated at this time, it is necessary to delay the information bits by at least an equal amount. Therefore, an additional four bit positions are provided for the *d*2 information bit stream register 17 and a single additional bit position is provided for the *d*3 information bit stream register 18.

At t11, it can be seen that the two syndrome bits generated by the *d*1 information bit stream appear at taps K and G of the syndrome bit register 22. The numbers along the bottom of the syndrome register 22 indicate the bit time, and bit position, when the syndrome bit was generated. The syndrome bits are combined by means of AND gate 24 and a correction signal N is applied to the EXCLUSIVE-OR gate 30 in the *d*1 information bit stream. Thus, it appears that at *t*11, a "1" bit appears in the 11th position of the *d*1 bit stream register 16 and forms the second input to the EXCLUSIVE-OR gate 30. The combination of these two signals results in a "0" being delivered at the 12th bit time which is the corrected *b*1 information bit.

The syndrome bit generated by the erroneous bit in the *d*2 information bit stream appears a the L and J taps at *t*11 and are similarly combined by means of the AND gate 26 and a correction signal P is applied to the EXCLUSIVE-OR gate 30. The erroneous bit in the *d*2 information bit stream register 17 appears at the output of the register at *t*11 as illustrated, and the combination in the EXCLUSIVE-OR gate 30 results in a "0" being delivered as the corrected *b*2 information bit stream at *t*12. Similarly, the syndrome bits generated by the erroneous bit in the *d*3 information bit stream appear at the H and M taps of the syndrome register 22 and are combined by means of the AND gate 28 to form a signal Q which is applied to the EXCLUSIVE-OR gate 30 together with the signal appearing at the output of the *d*3 information bit stream register 18 at *t*11 to form a corrected *b*3 information bit stream at *t*12.

It should be appreciated that the illustration of FIG. 3 is for a case where all three information bits of a character are erroneous. The illustration shows that, in order to correct an entire character, information from at least 11 prior characters must be used in order to arrive at at least two syndrome bits in the syndrome bit register 22 per information bit stream so that three separate correction signals can be generated simultaneously. It should also be appreciated that if only one of the information bits in a character is erroneous, the syndrome bit pattern is considerably simplified.

In order to prevent the "1" syndrome bit in the syndrome bit register 22 from possibly generating additional correction signals as they progress through the syndrome bit register, feedback lines from the N, P and Q signals are provided which combine with the signals at their associated taps to remove those syndrome bits from the syndrome bit register simultaneously with the generation of the correction signals. Thus, the N signal is combined by means of the EXCLUSIVE-OR gates 29, with the signal appearing at the G and K taps to produce a zero output at *t*12 in the following syndrome bit register position. Also, the P signal is applied to the J and L taps to change them to zero at *t*12 and the Q signal is applied only to the H tap to produce a zero signal at *t*12. The signal at tap M at the end of the syndrome bit register 22 need not be corrected as it disappears from the register at *t*12.

The above discussion is based on the assumption that the erroneous character was preceeded and followed by a number of correct characters at least as great as the number of characters needed to generate the parity check bits. This is based on the requirement that the syndrome register 22 be completely clear when the erroneous character is received and it can be seen from FIG. 3 that at least 11 bit times are required to generate the syndrome bit pattern needed to correct the character and an additional one bit time is needed to clear the syndrome register 22, for a total of 12 bit times. During that time, syndrome "1" bits from other erroneous characters cannot enter the syndrome register without the possibility of further errors being introduced.

The ability to detect and correct errors in adjacent characters is provided by means of "interleaving." In the coding system of the present invention, interleaving is provided by expanding all of the shift registers by a preselected interleaving factor. In the presently preferred embodiment, the chosen interleaving factor is six. Then the coding system of the invention is capable of correcting all errors in a series of six characters.

As was discussed above, while the implementation of the coding system of the present invention is relatively straightforward, the selection of the tap positions on the shift register in the information bit streams of both the encoder and decoder is relatively complex. From the above discussion, certain criteria for the successful operation of the system will be evident. In particular, only one information bit from a particular prior character can be used in generating the parity check bit. An additional limitation is that only two information bits from each information bit stream can be used.

The most difficult criteria to satisfy is that the syndrome bit pattern generated in response to an error in a particular information bit stream be able to move through the syndrome register and produce only one correction signal at a particular predetermined bit time. Additionally, the syndrome bit patterns resulting from a worst case of errors in all four bits of a character must be able to simultaneously move through the syndrome register without the syndrome bits for one error combining with the syndrome bits from another error to produce an erroneous correction bit.

The conventional method for considering all of the various shift register top positions is to treat each bit position in such a register as an element in a row matrix with a "1" element indicating a tap. The matrices may then be manipulated by means of matrix algebra, or specially defined rules, discussed below to determine their suitability. Following this convention, the shift register bit positions for the $b1$ through $b3$ information bit streams may be represented by the row matrices $\overline{X}$, $\overline{Y}$, and $\overline{Z}$, respectively. These matrices are of the form $$\overline{A}=[A_1\,A_2\text{---}A_i\text{---}A_k]$$

where $A_i$ is a general element of the matrix.

The array $$\overline{W}=[W_1\,W_2\text{---}W_i\text{---}W_k]$$

$$\overline{X}=[X_1\,X_2\text{---}X_i\text{---}X_k]$$

$$\overline{Y}=[Y_1\,Y_2\text{---}Y_i\text{---}Y_k]$$

$$\overline{Z}=[Z_1\,Z_2\text{---}Z_i\text{---}Z_k]$$

is known as a "code operator" for the character correcting coding system of the present invention, where the additional row vector $\overline{W}$ defines the parity check bit position of the encoder in relation to the elements of the information bit stream row matrices $\overline{X}$, $\overline{Y}$, and $\overline{Z}$. It will be appreciated that the array must satisfy certain criteria to qualify as a code operator.

First, since $\overline{W}$ represents the parity check bit position, there should only be a single "1" in the row matrix. Therefore, we can specify that $$W_1=1 \text{ and } W_i=0, i>1.$$

Similarly, since the parity check bit is a function of prior information bits, there can be no tap at the bit position defining the parity check bit. Therefore, $$X_1=Y_1=Z_1=0.$$

The condition that only a single information bit be tapped for any character which is a column of the array at a particular bit time can be written $$(\overline{X},\overline{Y})=(\overline{X},\overline{Z})=(\overline{Y},\overline{Z})=0$$

following the definition for the inner product of the matrices considered here that $$(\overline{A},\overline{B})=\sum_{i} A_iB_i \text{ (a scalar)}$$

The condition that each information bit stream be tapped at only 2 bit positions may be written $$(\overline{X},\overline{X})=(\overline{Y},\overline{Y})=(\overline{Z},\overline{Z})=2$$

The condition that the syndrome bit patterns generated from an error in each character bit position produce only a single correction bit as the syndrome bit pattern moves through the syndrome register is more difficult to specify. In the present invention, the shift register tap positions are considered in their relation to all the syndrome register tap positions. The syndrome tap positions are determined by forming a syndrome row vector S made up of the modulo-2 summation over the columns of the possible shift register tap positions. Thus, the syndrome vector can be defined as $$\overline{S}=\overline{W}\oplus\overline{X}\oplus\overline{Y}\oplus\overline{Z}$$

It can be seen that $\overline{S}$ has a "1" output only when a column is tapped for one of the information bit streams. Since we have previously specified that each column may have only one "1," there is no possibility of two "1"'s in a column summing to "0."

Since syndrome feedback is employed in the decoder of the present invention, it will be noted that the syndrome bit pattern produced by an error need only move through the syndrome register until the pattern is in position to produce the correction signal. Also, there is a limit on the number of shifts the syndrome bit pattern can make due to the length of the syndrome register and the condition that $X_1=Y_1=Z_1=0$ discussed above. Further it can be seen that, since the two syndrome "1" bits are needed for a correction bit, the syndrome bit patterns need not be tested until both syndrome "1" bits for an error are generated and fed to the syndrome register.

From the above discussion, it can be seen that the maximum number of shifts which a syndrome bit pattern can make may be tested by shifting the bit pattern until a "1" in the first bit position of the $\overline{X}$, $\overline{Y}$, or $\overline{Z}$ vectors is reached. This is the maximum possible shift because one of the criteria established above is that there can be no "1" in the first bit position of the $\overline{X}$, $\overline{Y}$ and $\overline{Z}$ vectors.

These maximum values may be tested by the following expressions:

$$(L^U \bar{X}, \bar{W}) = 1$$
$$(L^V \bar{Y}, \bar{W}) = 1$$
$$(L^T \bar{Z}, \bar{W}) = 1$$

where $(L^X \bar{A})$ is a left shift of the elements of $\bar{A}$ by X bit positions and U, V and T are the maximum number of shifts which are possible for the $\bar{X}$, $\bar{Y}$ and $\bar{Z}$ vectors, respectively.

Whether the $\bar{X}$, $\bar{Y}$ and $\bar{Z}$ vectors meet the condition that only a single correction signal be produced may be tested by noting that a correction signal is produced when two "1"'s of a vector occur simultaneously at the taps of the syndrome register, represented by $\bar{S}$. Thus, if this occurs no more than once within the permissible maximum number of shifts through the shift register, the condition is satisfied.

The $\bar{X}$, $\bar{Y}$ and $\bar{Z}$ vectors may be tested by the following relationships:

$$(L^t \bar{X}, \bar{S}) \leq 1 \text{ for } t \leq U$$
$$(L^t \bar{Y}, \bar{S}) \leq 1 \text{ for } t \leq V$$
$$(L^t \bar{Z}, \bar{S}) \leq 1 \text{ for } t \leq T$$

which means that the correction signal must occur no more than once within the maximum number of shifts $U$, $V$ and T permissible for the $\bar{X}$, $\bar{Y}$ and $\bar{Z}$ vectors, respectively.

For the illustrative embodiment described above, the code operator which establishes the taps of the shift registers is as follows:

$$\bar{W} = 100000000000$$
$$\bar{X} = 000001000001$$
$$\bar{Y} = 000100010000$$
$$\bar{Z} = 001000000010$$

As will be more fully discussed below, the above tests are particularly adaptable to being implemented automatically on a machine such as a digital computer. Additionally, while the tests and conditions described above are for a character having three information bits it should be appreciated that the general theory of operation is applicable to an $n$-bit character having $n-1$ information bits. Also, while a minimum constraint length is usually desired for practical implementation purposes, as discussed above, it should be remembered that constraint lengths longer than the minimum are possible and may even be desirable under certain conditions.

Therefore, the method of testing a potential code operator for use in the character correcting coding system of the present invention will be developed for the general case of an n-bit character without a specified constraint length. In this regard, it should be noted that if a constraint length less than the minimum is selected one or more of the conditions will fail for all possibilities of code operator arrays. As was discussed above in regard to the code operator for the four-bit character, it was found that a minimum constraint of 12 was necessary. Additionally, it was found that only two out of approximately 20,000 possible arrays were suitable as a code operator for the system of the present invention. Thus, it will be appreciated that a great many possible code operators would have to be tested to find suitable arrays. It will be appreciated that, from a practical standpoint, machine implementation of the determining method is necessary.

In the consideration of the general case, it should be noted that the $\bar{W}$ vector, associated with the parity check bit stream, is constant so that the only truly variable vectors are those associated with the information bit streams. Each of those information bit streams will have an associated tapped shift register with the taps defined by a matrix row vector. For the purposes of the following discussion, common matrix vector notation will be employed. A vector then has the general form $$\bar{A}^i = (A_1^i A_2^i --- A_a^i --- A_k^i)$$

where $A_a^i$ is the general element.

For the $n$-bit character, there will be $n-1$ information bit vectors arranged in the form $$\bar{X}^1 = (X_1^1 X_2^1 --- X_a^1 --- X_k^1)$$
$$\bar{X}^2 = (X_1^2 X_2^2 --- X_a^2 --- X_k^2)$$
$$\vdots$$
$$\bar{X}^i = (X_1^i X_2^i --- X_a^i --- X_k^i)$$
$$\vdots$$
$$\bar{X}^j = (X_1^j X_2^j --- X_a^j --- X_k^j)$$
$$\vdots$$
$$\bar{X}^{n-1} = (X^{n-1} X^{n-1} --- X_a^{n-1} --- X_k^{n-1})$$

where the constraint length $k$ is generally equal to or greater than $2n-1$ and the letters ($i$), ($j$) and ($a$) indicate general elements.

Generally, the inner product operation $(\bar{A}, \bar{B})$ is defined as $$(\bar{A}, \bar{B}) = \sum_a A_a B_a \text{ as before}$$

---

The vectors are tested for suitability as code operators by performing the following steps:

1. defining a vector $W = (\bar{W}_1 W_2 --- W_a --- W_n)$ having $W = 1$ and $W_a = 0$ for $a > 1$;
2. specifying the elements of each $\bar{X}^i$ vector so that $$(\bar{X}^i, \bar{X}^j) \begin{cases} = 0 \text{ where } i \neq j, \text{ and} \\ = 2 \text{ where } i = j; \end{cases}$$

3. generating a vector array $S$ defined by the relationship $$\bar{S} = \bar{W} \oplus \bar{X}^1 \oplus \bar{X}^2 --- \oplus \bar{X}^i --- \oplus \bar{X}^j --- \oplus \bar{X}^{n-1}$$

where the general element $S_a = W_a \oplus X_a^1 \oplus X_a^2 --- \oplus X_a^i --- \oplus X_a^j --- \oplus X_a^{n-1}$ and is the symbol representing modulo-2 summation.

4. shifting each $\bar{X}^i$ vector to the left position by position by the operation $L^T{}_{\bar{A}}$, defined as a shift to the left of the elements of $\bar{A}$ by T positions. Each $\bar{X}^i$ vector is shifted until $(L^{T(i)} \bar{X}^i, \bar{W}) = 1$ for the first time where $T(i)$ is the number of necessary shifts for each of the vectors $\bar{X}^i$;

5. determining whether the functions $(L^{t(i)} \overline{X}_j^i \overline{S}) \leqslant 1$ where $1 \leqslant t(i) \leqslant T(i)$ are true for all values of $i$. If the values are true, then said plurality of $\overline{X}^i$ vectors, together with the $\overline{W}$ vector, form a suitable code operator for the character correcting coding system of the present invention.

If any of the above steps fail during the testing of a particular vector array, that array is not suitable for use as a code operator in the system of the present invention. It will be appreciated that the steps of the above method, including the variation of test arrays may be implemented by a properly programmed digital computer. Such a program is described below.

Figure 4:
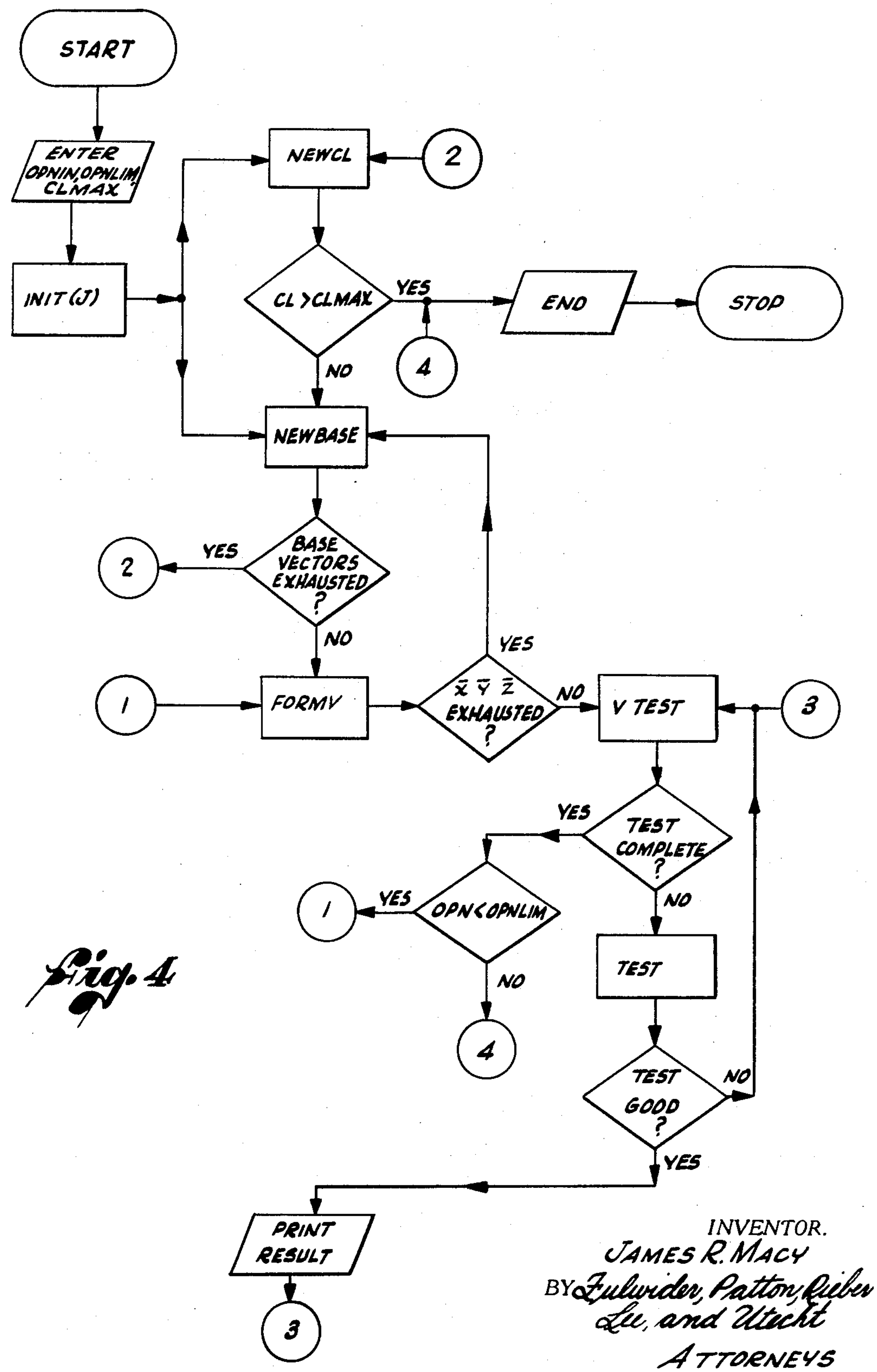
FIG. 4 is a flow chart of a computer program suitable for implementing the method of the invention.

FIG. 4 is a flow chart for a computer program for searching through all possible operator arrays which satisfy the basic algorithmic constraints regarding character size, the number of "1"'s in a row, and the number of "1"'s in a column. The program tests, selects and prints those "good" operators which satisfy the character correcting code operators. The program itself is written in "A Programming Language" (APL) and a program listing is given in the appendix.

The program comprises a number of subroutines which are generally of three classes, input-output, operator array construction, and operator testing with some overlap in the functions of the last two classes.

The program is begun by entering the limiting parameters for a particular run. These parameters are CLMAX which is the maximum constraint length of operators to be tested, OPNIN which corresponds to the initial operator in the list of all good operators, and OPNLIM is the number of the last good operator to be tested. The difference OPNLIM-OPNIN is the number of good operators to be printed in the particular run.

An initializing subroutine INIT-- is used to start the search at the desired point in the sequence of all possible operators, the starting point being designated by a two digit number at the end of the subroutine name, e.g., for the program listing in the appendix, INIT12. Once the program is started, it is self-incrementing and automatically goes to a longer constraint length when all the operators of the current constraint length are exhausted. Additionally, the program prints out all convolutional, character correcting code operators which have tested good.

The various other subroutines shown on the flow chart and the program listing are briefly described below.

NEWCL reinitializes the program for a new constraint length. NEWBASE forms a new set of base vectors to be used in the FORMV subroutine. FORMV forms row vectors of possible operators for testing. These three subroutines form the class of subroutines for operator array construction.

VIEST controls the TEST subroutines and the printing and storing of convolutional, character correcting code operators which test good. TEST performs the basic tests to determine whether an operator is good. These two subroutines form the class for operator testing.

END gives the maximum constraint length and number of operators tested to date in printed form. The END subroutine, together with the INIT-- subroutine form the class of input-output subroutines.

Thus, the character correcting coding system of the present invention is able to correct entire characters substantially within the limits set for serial bit stream correcting codes. While the coding system of the present invention has been described in detail for a particular constraint length and character size, it will be appreciated that the inventive concept involved is applicable to the general case as described herein. Therefore, the scope of the invention is not to be limited except by the following claims.

APPENDIX

```
      )GRP CCC SEARCH
INIT12  NEWCL    NEWBASE FORMV    VTEST    TEST      END

      ∇INIT12[⎕]∇
    ∇ INIT12
[1]     SN←WN←XN←YN←ZN←ι0
[2]     OPN←OPNIN
[3]     W←1,11ρ0
[4]     OA←(6ρ0),1,5ρ0
[5]     OB←(7ρ0),1,4ρ0
[6]     OC←(8ρ0),1,3ρ0
[7]     OD←(9ρ0),1,2ρ0
[8]     OE←(10ρ0), 1 0
[9]     OF←(11ρ0),1
[10]    A←OA
[11]    B←OB
[12]    C←OC
[13]    D←OD
[14]    E←OE
[15]    F←OF
[16]    I←J←0
[17]    NEWBASE
[18]    NEWCL
[19]    CHECK
    ∇
```

```
    ∇NEWCL[⎕]∇
  ∇ NEWCL
[1]   A←OA←0,OA
[2]   B←OB←0,OB
[3]   C←OC←0,OC
[4]   D←OD←0,OD
[5]   E←OE←0,OE
[6]   F←OF←0,OF
[7]   W←W,0
[8]   NEWBASE
[9]   →11×ι(ρW)>CLMAX
[10]  →1
[11]  OPNLIM←OPN
[12]  END
  ∇

    ∇NEWBASE[⎕]∇
  ∇ NEWBASE
[1]   FORMV
[2]   A←1ΦA
[3]   →0×ιA[1]=W[1]
[4]   FORMV
[5]   B←1ΦB
[6]   →RB×ι∧/B=A
[7]   FORMV
[8]   C←1ΦC
[9]   →RC×ι∧/C=B
[10]  FORMV
[11]  D←1ΦD
[12]  →RD×ι∧/D=C
[13]  FORMV
[14]  E←1ΦE
[15]  →RE×ι∧/E=D
[16]  FORMV
[17]  →14
[18] RE:E←OE
[19]  →11
[20] RD:D←OD
[21]  →8
[22] RC:C←OC
[23]  →5
[24] RB:B←OB
[25]  →2
  ∇

    ∇FORMV[⎕]∇
  ∇ FORMV
[1]  LOOPV:X←A∨B
[2]   Y←C∨D
[3]   Z←E∨F
[4]   VTEST
[5]   Y←C∨E
[6]   Z←D∨F
[7]   VTEST
[8]   Y←C∨F
[9]   Z←D∨E
[10]  VTEST
[11]  X←A∨C
[12]  Y←B∨D
```

```
[13]   Z←E∨F
[14]   VTEST
[15]   Y←B∨F
[16]   Z←D∨F
[17]   VTEST
[18]   Y←B∨F
[19]   Z←D∨E
[20]   VTEST
[21]   X←A∨D
[22]   Y←B∨C
[23]   Z←E∨F
[24]   VTEST
[25]   Y←B∨E
[26]   Z←C∨F
[27]   VTEST
[28]   Y←B∨F
[29]   Z←C∨E
[30]   VTEST
[31]   X←A∨E
[32]   Y←B∨C
[33]   Z←D∨F
[34]   VTEST
[35]   Y←B∨D
[36]   Z←C∨F
[37]   VTEST
[38]   Y←B∨F
[39]   Z←C∨D
[40]   VTEST
[41]   X←A∨F
[42]   Y←B∨C
[43]   Z←D∨E
[44]   VTEST
[45]   Y←B∨D
[46]   Z←C∨E
[47]   VTEST
[48]   Y←B∨E
[49]   Z←C∨D
[50]   VTEST
[51]   →0
     ∇

       ∇VTEST[⎕]∇
     ∇ VTEST
[1]    S←W∨X∨Y∨Z
[2]    T←X
[3]    TEST
[4]    →0×⍳SW=1
[5]    T←Y
[6]    TEST
[7]    →0×⍳SW=1
[8]    T←Z
[9]    TEST
[10]   →0×⍳SW=1
[11]   'CODE ID =  ';⍴W;'-';(OPN←OPN+1);'-';(J←J+1)
[12]   MATFORM←(5,⍴W)⍴W,X,Y,Z,S
```

```
[13]  MATFORM
[14]  ''
[15]  →0×⍳OPN<OPNLIM
[16]  END
    ∇
      ∇TEST[⎕]∇
    ∇ TEST
[1]    SW←0
[2]   LOOP:T←1⌽T
[3]    →INCR×⍳∧/(T=T∧S)
[4]    →LOOP×⍳1≠T[1]
[5]    →0
[6]   INCR: SW←1
[7]    J←J+1
[8]    →0
    ∇
      ∇END[⎕]∇
    ∇ END
[1]   ''
[2]   ''
[3]   'THIS RUN WAS FOR OPERATORS OF CONSTRAINT LENGTH ≤ ';⍴W;' THE NUMBER OF OPERATORS TESTED IS: ';J
    ∇
        )OFF
030   9.38.20  10/23/70  ADS
CONNECTED     0.12.47   TO DATE   3.42.05
CPU TIME      0.00.03   TO DATE   0.20.47
```

I claim:

1. A character correcting coding system for use in a data communications system wherein four bits may be simultaneously transmitted and received in each transmission bit time, said coding system comprising:

encoding means for generating a parity check bit stream from an input of first, second and third information bit stream, said encoding means simultaneously generating an output of said first, second and third information bit streams and said parity check bit stream, each parity check bit of said parity check bit stream being formed by simultaneous modulo-2 summation of the fifth and 11th prior information bits of said first information bit stream, the third and seventh prior information bits of said second information bit stream and the second and 10th prior information bits of said third information bit stream said parity check bit stream and said first, second and third information bit streams being transmitted simultaneously to a receiving section by said data communication system;

storage means in said receiving section of said data communications system for successively storing eleven prior received information bits for each of said first, second and third information bit streams;

summation means connected to said storage means for forming a successive modulo-2 sum of the fifth and 11th prior received information bits of said first information bit stream, the third and seventh prior received information bits of said second information bit stream, the second and tenth prior received information bits of said third information bit streams and the immediately received parity check bit from said received parity check bit stream the successive modulo-2 summation forming a syndrome bit stream;

syndrome bit storage means connected to said summation means for successively storing said syndrome bit stream;

combining means connected to said syndrome bit storage means for combining a presently generated syndrome bit with the sixth previously generated syndrome bit to form a first correction signal for said first information bit stream, for combining the fourth and seventh previously generated syndrome bits to form a second correction signal for said second information bit stream and for combining the first and sixth previously generated syndrome bits to form a third correction signal for said third information bit stream, each of said first, second and third correction signals being modulo-2 added to the 11th prior received information bits of said respective first, second and third information bit streams to correct said 11th prior received information bits.

2. The character correcting coding system of claim 1 wherein an interleaving factor of six is provided by expanding all storage times by a factor of six whereby six successive erroneously received characters may be corrected.

3. The character correcting coding system of claim 1, wherein said encoding means includes three shift registers for storing each of said three information bit streams, the shift register for a first information bit stream being tapped at the fifth and 11th bit position, the shift register for a second information bit stream being tapped at the third and seventh bit position and the shift register for a third information bit stream being tapped at the second and 10th bit position, the output of all of said taps being modulo-2 added to form said parity check bit stream;

said storage means includes shift registers having 11bit positions for each of said three information bit streams, the shift register for said first information bit stream being tapped at the fifth and 11th bit positions, the shift register for said second information bit stream being tapped at the third and seventh bit position and the shift register for said third information bit stream being tapped at the second and 10th bit positions;

said summation means forms the modulo-2 sum of the outputs of all of said taps;

said syndrome bit storage means is a shift register tapped at the first, fourth, sixth, seventh and ninth bit positions;

said combining means forms the logical AND of the input to the syndrome bit shift register and the output of the sixth tap of the register to form a correction signal for said first information bit stream, forms the logical AND of the outputs of the fourth and seventh taps of the register to form a correction signal for said second information bit stream, and forms the logical AND of the outputs of the first and ninth taps of the register to form a correction signal for said third information bit stream;

said correcting means includes a first exclusive-OR logic gate having as its inputs the output of the shift register for said first information bit stream and said correction signal for said first information bit stream, a second exclusive-OR logic gate having as its inputs the output of the shift register for said second information bit stream and said correction signal for said second information bit stream, and a third exclusive-OR logic gate having as its inputs the output of the shift register for the third information bit stream and said correction signal for said third information bit stream, the outputs of said exclusive-OR logic gates being the corrected information bit streams.

4. The character correcting coding system of claim 3 including means for feeding back said correction signals to the tap positions which generated them to cancel the outputs.

5. The character correcting coding system of claim 4 wherein said means for feeding back are exclusive-OR logic gates having as their inputs the tap position output and a correction signal and the outputs of said gates being the inputs to the next shift register bit position.

6. A character correcting coding system for use in a data communications system wherein a plurality of data bits may be simultaneously transmitted and received in each transmission bit time, said coding system comprising:

encoding means for generating a parity check bit stream from an input of plurality of information bit streams, said check bit stream being formed by simultaneous modulo-2 summations of two prior information bit values from each information bit stream, said two prior information bit values from each information bit stream being selected by means of a code operator having the following characteristics;

a. said code operator includes in a plurality of row vectors arrayed as a matrix, one row vector for said parity check bit stream and one row vector each for said information bit streams;

b. said parity check row vector having a "1" value in its first column position and "0" values thereafter;

c. each of said information bit stream row vectors having a "0" in its first column position and no more than two "1"'s in the remainder of its column positions' d. each column of said arrayed vectors has only one "1" value; and e. the inner product of each of said information bit stream row vectors and a syndrome vector produce no more than one correcting signal as the row vector is horizontally displaced until a first "1" each of said information bit stream row vectors is in the first column position, the syndrome vector being defined as the modulo-2 summation of each column of the arrayed information bit stream row vectors and the parity check row vector, said plurality of information bit streams being simultaneously transmitted with said parity check bit stream by said data communications system to a receiving section of said communication system;

storage means in said receiving section of said data communications system for successively storing received information bits of each of said plurality of information bit streams;

summation means connected to said storage means for forming a modulo-2 summation of two predetermined stored prior received information bits from each of said stored plurality of information bit streams and received check bit stream, said predetermined stored prior received information bits being selected by means of said code operator, the successive summation generating a syndrome bit stream;

syndrome bit storage means connected to said summation means for successively storing said syndrome bit stream;

combining means connected to said syndrome bit storage means for combining two previously generated syndrome bits for each information bit stream to produce correction signals for each of said information bit streams;

delay means connected to said information bit stream storage means for each information bit stream for further storing each information bit stream by an amount necessary for the production of said correction signal; and correcting means connected to said delay means and said combining means for combining information bits in each information bit stream at the output of said delay means with said correction signals to produce corrected information bit streams.

7. The character correcting coding system of claim 6 wherein interleaving is provided by expanding all storage times and delays by an interleaving factor whereby the plurality of successively erroneously received characters up to the numerical value of the interleaving factor may be corrected.

* * * * *

PO-1050
(5/69)

UNITED STATES PATENT OFFICE
CERTIFICATE OF CORRECTION

Patent No. 3,697,947 Dated October 10, 1972

Inventor(s) JAMES R. MACY

It is certified that error appears in the above-identified patent and that said Letters Patent are hereby corrected as shown below:

Column 9, line 21, "tape" should be --taps--; line 23, "bit" (first occurrence) should be --bits--.

Column 12, line 33, "vector S" should be --vector $\bar{S}$--.

Column 14, line 48, after "vector" delete "W =($\bar{W}_1$" and insert --$\bar{W}$ = ($W_1$--.

Column 16, line 19, "VIEST" should be --VTEST--.

Signed and sealed this 8th day of May 1973.

(SEAL)
Attest:

EDWARD M.FLETCHER,JR.
Attesting Officer

ROBERT GOTTSCHALK
Commissioner of Patents